Nov. 2, 1948.  L. O. D. HARRIS ET AL  2,452,567
ROTARY VEGETABLE CUTTER ON A HORIZONTAL
AXIS WITH A FOLLOWER FEED
Filed March 14, 1946  2 Sheets-Sheet 1

Inventors
LEONARD O. D. HARRIS
AND WILLIE P. PADGETT.

By *Clarence A. O'Brien*
*and Harvey B. Jacobson*
Attorneys

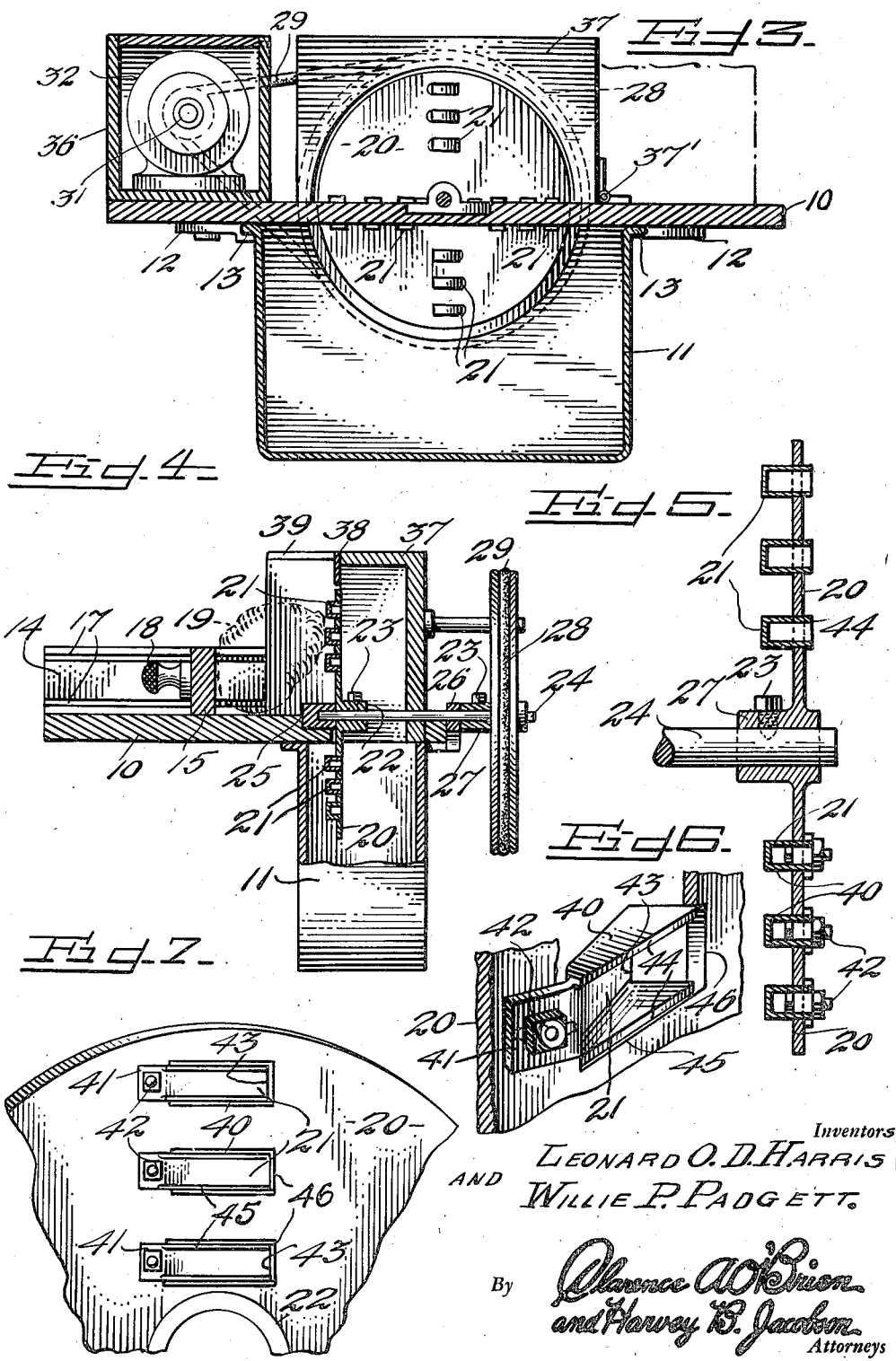

Patented Nov. 2, 1948

2,452,567

UNITED STATES PATENT OFFICE 2,452,567

ROTARY VEGETABLE CUTTER ON A HORIZONTAL AXIS WITH A FOLLOWER FEED

Leonard O. D. Harris, Clifton, Va., and Willie P. Padgett, Forest City, N. C.; said Padgett assignor to said Harris Application March 14, 1946, Serial No. 654,313

3 Claims. (Cl. 146—115)

1

This invention relates to vegetable cutters, designed to be driven by power, such as an electric motor, to quickly and properly cut up vegetables into smaller or comminuted particles, such as potatoes or the like and to discharge the same into a removable container or drawer from which the same may be emptied for use or cooking.

An object of the invention is to provide a novel or simple form of vegetable cutter having means for pressing the vegetables such as potatoes, or the like, against the cutter blades or slicers of a rotating cutting member with the desired force to efficiently cut the same into smaller portions.

Another object of the invention is to provide a novel form of cutter or blades and mounting therefor on a rotating disc or wheel revolving at high speed by means of a suitable motor and capable of adjustment to cut the vegetables into pieces as desired.

Another object of the invention is to provide a cutter which comprises a simple and compact assembly capable of economical production and which will efficiently serve its purpose as well as being durable in use.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal sectional view vertically on the line 3—3 of Figure 1.

Figure 4 is a transverse vertical sectional view taken on the line 4—4 of Figure 2.

Figure 5 is an enlarged diametrical sectional view of the cutter showing the mounting of the cutters or cutter blades thereon.

Figure 6 is a perspective view partly broken away and in section, showing the mounting of a cutter, and Figure 7 is a fragmentary enlarged elevation showing the mounting of the cutters on the cutter disc.

Figure 1:
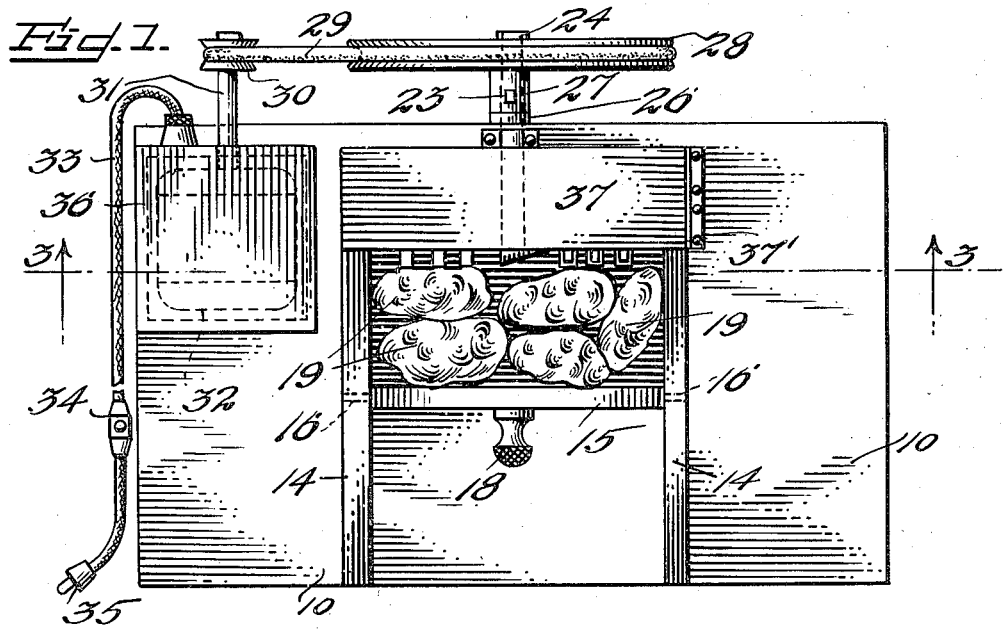
Figure 1 is a plan view of a vegetable cutter constructed in accordance with the invention.
Figure 2:
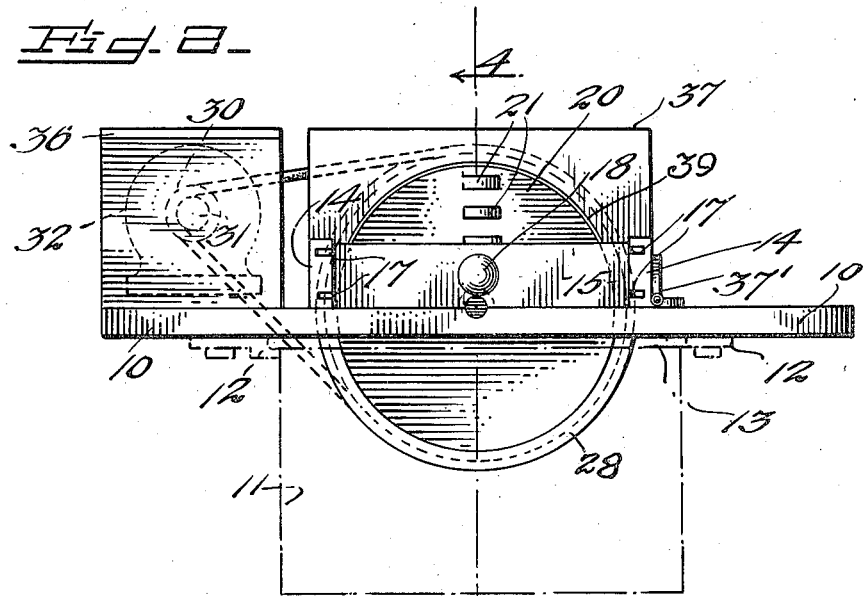
Figure 2 is a side elevation thereof.

Referring to the drawings in detail, in which like reference characters designate corresponding parts throughout the several views, the vegetable cutter is shown as comprising a suitable horizontal support or table 10, which may be independently supported on a bench or table and having a receptacle or drawer 11 beneath an opening therein, slidable in guide ways 12 by means of side flanges 13 at the top of the receptacle or drawer, while the guides 12 are provided beneath the horizontal support or board 10 constituting the base of the device.

Mounted vertically on the rectangular horizontal support 10 are spaced parallel vertical guides 14 in which a follower or pressure plate 15 is slidably mounted as by means of pins 16 engaging grooves 17 at the inner faces of the guides or plates 14 and provided with a knob or handle 18 by which the same may be forced against the vegetables such as potatoes indicated at 19 to press the same against the cutter in the form of a disc 20 having a plurality of cutting blades 21 arranged in radial rows thereof, preferably aligned and extending diametrically of the cutter disc 20. This disc of the cutter member is fixed at its hub 22 as indicated at 23 by means of a set-screw or other suitable means, to a horizontal shaft 24 journaled in a bearing 25 at the inner end on the support 10 and another bearing 26 in the form of a bracket inwardly of the hub 27 of a V-grooved pulley 28 also secured as by a set screw 23 to the outer end of the shaft 24. An endless belt 29 is engaged on the pulley 28 and a pulley 30 of smaller diameter fixed to the outer end of a shaft 31 constituting the rotor shaft of a motor 32 shown as an electric motor having an extension cord or cable 33 with a control switch 34 interposed in the length thereof and a plug 35 at the free end thereof for plugging into the socket of the house wiring of the supply line circuit. The motor 32 is supported within a casing 36 mounted on one end of the table or support 10 at the corner thereof.

The cutter disc or wheel 20 is protected by a cover or housing 37 hinged at 37′ on the support 10 and against the inner side portion 38 of which it operates so as to keep the cutter clean at one side. If desired, inner side 38 has a bottom opening 39 at the front of the cutter to expose the front face thereof except at its peripheral edge to engage the vegetables and protect the cutter member. Thus, the edge of the cutter disc 20 operates under the top housing portion 37 and depends into the receptacle or drawer 11 into which the cut vegetables are discharged and collected for use. The cutting blades 21 have sides or flanges 40 and are detachably and adjustably mounted on the disc 20. They comprise channel or U-shaped members having end lugs 41 at their bight or connecting portions apertured to adjustably secure the same to the disc as by means of bolts or the like 42, either the disc or the lugs being slotted to permit adjustments and projection of the cutting edges 43 at the ends of the base, bight or connecting portions at the opposite enlarged or widened ends of the cutter blades 21 from the surface at the inside of the disc. It will be noted that the sides or top and bottom surfaces of the cutter blades are of substantially triangular formation and therefore, beveled on one side constituting the hypotenuse of the triangular formation as indicated at 44, so as to project at an acute angle from the surface of the disc. The enlarged ends of the cutter blades may be embedded in slots or openings 45 formed in the disc and retained in position by slot ends 46 to project from the opposite side of the disc to permit the necessary frictional engagement and adjustment of the projection of the cutter blades.

In operation of the device, the vegetables are placed in the space between the follower 15 and the side plates or boards 14 and pressed against the cutter member. The motor is switched on at the switch 34 so as to rotate the disc against the vegetables to cut portions therefrom, which as they are cut, are deposited into the receptacle or drawer 11 to be emptied therefrom as desired.

It will thus be seen that I have provided a vegetable cutter which will efficiently cut vegetables of various kinds, especially potatoes or the like, into slices or small portions for cooking and that it will greatly expedite the slicing thereof as compared to hand slicing.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

We claim:

1. A vegetable cutter including a support, a receptacle provided beneath an opening in the support, a cutter member arranged vertically and rotating on a horizontal axis to extend into the receptacle, said cutter member comprising a disk having elongated openings therein extending at right angles to radii of the disk equi-distantly spaced apart and arranged in radial rows, and cutter blades having angular lugs secured to the side of the disk opposed to the side against which the vegetables to be cut are adapted to be arranged, and being in the form of channels with tapered sides having the edges of their wide ends in line with the cutting edges at the open sides of the channels frictionally engaged in the opposite ends of the openings to adjust the projection of the cutting edges from the opposite side of the disk, and means for pressing the vegetables against the cutter and means for adjusting the cutters relative to the vertical plane of the disc, whereby the cutting size may be controlled.

2. A vegetable cutter including a horizontal support having an opening therein, a shaft horizontally journaled to extend across the opening, a cutter disc fixed to the shaft, side plates on the support in front of the disc, a follower between said side plates adapted to force the vegetables against the disc, a housing over the disc, a pusher knob on said follower, a receptacle slidably mounted under the support beneath the disc and opening, means for driving the shaft and cutter blades carried by the disc, said disc having openings therein arranged in diametrically aligned radial series spaced apart, cutter blades mounted in said openings and adjustable relative to the vertical plane of the disc, said cutter blades including cutting edges arranged angularly to the surface of the disc and having side portions extending therethrough, said cutter blades having end lugs and means to secure said end lugs to the disc to adjust the cutter blades frictionally through the openings the wide end of the side portions forming edges extending from the cutting edges and frictionally engaged within the ends of the openings remote from the secured ends of the cutter blades.

3. A vegetable cutter including a horizontal support having an opening therein, a shaft horizontally journaled to extend across the opening, a cutter disc fixed to the shaft, side plates on the support in front of the disc having parallel longitudinal upper and lower grooves in their inner faces, a follower between said side plates having end projections slidably engaging the grooves and adapted to force the vegetables against the disc, a housing over the disc, a receptacle slidably mounted under the support beneath the disc and opening, means for driving the shaft and cutter blades carried by the disc, said disc having openings therein arranged as the chords of arcs in radial series spaced apart, cutter blades adjustably mounted in said openings, said cutter blades including cutting edges perpendicular to said chords across common ends of the openings arranged angularly to the surface of the disc and having right angled triangular side portions extending therethrough, said cutter blades having end lugs and means to secure said end lugs to the disc to adjust the cutter blades frictionally through the openings, said cutter blades having portions connecting the side portions and end edges at the wide ends of the side portions at points remote from the cutting edges engaged against the opposite ends of the openings to retain the blades in position.

LEONARD O. D. HARRIS.
WILLIE P. PADGETT.

REFERENCES CITED

The following references are of record in the file of this patent:

UNITED STATES PATENTS

| Number | Name | Date |
|---|---|---|
| 85,599 | Markel | Jan. 5, 1869 |
| 272,041 | Green | Feb. 13, 1883 |
| 415,682 | Parker | Nov. 19, 1889 |
| 477,377 | Martindale | June 21, 1892 |
| 571,609 | Bohannan | Nov. 17, 1896 |
| 1,519,532 | De Eulis et al. | Dec. 16, 1924 |
| 1,598,999 | Wilson | Sept. 7, 1926 |
| 1,931,857 | Baccellieri | Oct. 24, 1933 |

FOREIGN PATENTS

| Number | Country | Date |
|---|---|---|
| 44 | Great Britain | Nov. 5, 1892 |
| 33,703 | Austria | July 25, 1908 |